Patented Feb. 18, 1941

2,232,118

UNITED STATES PATENT OFFICE 2,232,118

ALKYL SUBSTITUTED BENZENE SULPHONIC ACIDS AND SALTS

Lucas P. Kyrides, Webster Groves, Mo., assignor to Monsanto Chemical Company, St. Louis, Mo., a corporation of Delaware No Drawing. Application June 5, 1939, Serial No. 277,451

15 Claims. (Cl. 260—505)

The present invention relates to the use of a new agent for scouring, washing, detergent and the like purposes.

The compounds of the present invention may be used alone or in combination with other suitable detergents as cleaning and scouring agents. In particular, they may be used to remove fatty and oily materials from vegetable and animal fibres. In addition, builders such as sodium sulphate, magnesium sulphate, sodium carbonate and the like may be used in admixture with these detergents. These builders may be used in varying amounts but in general the concentration may range from 10% to 60% by weight. The compounds of the present invention as well as admixtures of them with builders may be used as soap substitutes. The compounds of the present invention have a very high detersive efficiency and may be used in a wide variety of industries.

Broadly, the invention relates to the use of a mixture of mono-sulphonated alkylated benzene hydrocarbons and their metallic salts, preferably the inorganic water-soluble salt such as the sodium and potassium salts, wherein at least one of the alkyl groups is obtained from a mixture of hydrocarbons having a distilling range of substantially 160–245° C. and consisting mostly of aliphatic-polymer mono-olefins and small amounts of aliphatic-polymer olefins which depolymerize at low temperatures in the presence of AlCl$_3$. The aromatic nucleus of these mono-sulphonated alkylated compounds are hydrocarbons of the benzene series or mixtures thereof, for example, benzene, toluene, xylene, ethyl benzene and the like, and which boil within the range of 79° to 184° C. but preferably within the range of 79° to 110° C. More particularly, the present invention relates to detergents, scouring and washing agents comprising mixtures of mono-sulphonated mono-alkylated benzenes wherein said alkyl group is obtained from a mixture of hydrocarbons having a distilling range of substantially 175–228° C. and consisting mostly of aliphatic-polymer mono-olefins and small amounts of aliphatic-polymer olefins of the triisobutylene type that depolymerize in the presence of AlCl$_3$. In preparing the compounds of the present invention, the mixture of polymer mono-olefins is used as an alkylation medium, under conditions described hereinafter, in the presence of a Friedel-Crafts catalyst to prepare the desired alkylated benzene hydrocarbons. After separating this mixture of alkylated hydrocarbons from the reaction products, it is converted to the mono-sulphonic acid or corresponding water soluble sulphonate.

The mono-olefins present in the polymer hydrocarbons distilling within the range of 160–245° C. will consist mostly of decenes, undecenes, dodecenes, tridecenes and tetradecenes, whereas, the mono-olefins in the hydrocarbon polymers distilling within the range of 175–228° C. will consist mostly of the undecenes, dodecenes and tridecenes. The hydrocarbon polymers suitable for preparing the products of this invention contain certain types of aliphatic mono-olefins which depolymerize or break up into short chains during the alkylation reaction. Triisobutylene is a typical example of the type of polymer olefins that depolymerize during the alkylation reaction. These short chain formers, such as triisobutylene and olefins of similar structure are present in the polymers used in preparing the products of this invention and are referred to herein as polymer olefins of the triisobutylene type. By using an excess of the hydrocarbon of the benzene series—at least five mols to one mol of the polymers in the alkylation reaction, these short chain alkyl radicals resulting from depolymerized polymers will form alkylated benzenes of lower boiling point than alkylated benzenes formed from polymer olefins that do not break up during the alkylation reaction—this reduces the formation of polyalkylated benzene hydrocarbons, some of which are of the same boiling point as the desired products whereas others are of high molecular weight.

The fraction of polymer mono-olefins used in preparing the product of this invention may be formed during the polymerization process used for the production of motor fuel and like products, wherein mixtures of normally gaseous olefin-containing hydrocarbons, such as those containing mostly propylene and butylenes, are used as the charging stock and are catalytically or thermally polymerized at elevated temperatures and pressures. The polymer olefins used in preparing the detergents are recovered from the other polymers produced by the polymerization reaction. The composition of the polymer-mono-olefins used in preparing the products of this invention will vary somewhat with the composition of the feed gas charged to the polymerizer, the composition of the catalyst, and the operating conditions used to effect the polymerization. Since the feed gases contain tertiary olefins such as isobutylene, the polymer resulting from the polymerization reaction will contain polymer tertiary mono-olefins—some of which will depolymerize under the conditions of the alkylation reaction. Some refiners use the well-known "solid phosphoric acid" type of catalyst which may be used at pressures ranging from about 200–650 lbs. and temperatures ranging from 315–415° F. to polymerize the gaseous charging stock whereas other refiners may use alumina suspended on silica at temperatures of 450–600° F. and pressures of about 1000–1600 pounds. Likewise, the well known sulphuric acid process may be used to polymerize these normally gaseous olefin-containing hydrocarbons. A preferred source of the polymer olefins is from a selective catalytic polymerization process wherein the feed gases consist mostly of butylenes; such processes may be performed under a variety of conditions, such as those set forth above.

The polymer boiling between substantially 160–245° C. but preferably 175–228° C., and used to prepare the compounds of this invention, will contain a substantial proportion of mono-olefins and these polymer mono-olefins are mostly aliphatic mono-olefins along with small amounts of polymer olefins of the triisobutylene type or short chain formers. While the concentration of olefins in these polymers will vary with the conditions used in their preparation, frequently it is as high as 85–95% and in general is above about 70%. The following table sets forth the properties of illustrative examples of polymer mono-olefins that have been used to prepare the products of my invention:

TABLE I

EXAMPLE A

Refractive index at 20° C_____ 1.4395
Density at 20° C_____ 0.773
Bromine number _____ 94
Percent unsaturated _____ 94% (about)
Boiling range _____ 171–227° C.

5% off at 182° C.
96% off at 218° C.

EXAMPLE B

Refractive index at 20° C_____ 1.4595
Density_____ 41.1° A. P. I.
Percent unsaturated_____ 92% (about)
Boiling range_____ 189–231° C.

5% off at 192° C.
98% off at 231° C.

In preparing the alkylated benzene hydrocarbons from the polymer mono-olefins, an excess of benzene, toluene or other benzene hydrocarbon is reacted with the polymer olefin with the aid of a Friedel-Crafts type of catalyst. Generally, one mol of the olefin is used for about each five to twelve mols of the benzene hydrocarbon but, preferably, one mol of the olefin is used for seven to ten mols of the benzene hydrocarbon. The polmer mono-olefins in the alkylation reaction mixture produce alkylated benzene hydrocarbons wherein the alkyl chain has the same number of carbon atoms as the polymer. By performing the alkylation reaction under the conditions indicated hereinafter, mostly the mono-alkylated benzene hydrocarbons are produced, that is, one alkyl chain having the same number of carbon atoms as a polymer hydrocarbon will be added to the benzene, toluene, xylene, etc., nucleus. However, polymer olefins of the triisobutylene type, or at least a portion of them, present in the alklation reaction mixture undergo a depolymerization reaction and yield hydrocarbon radicals that contain a smaller number of carbon atoms than the polymer mono-olefins. The presence of an excess of the hydrocarbon of the benzene series during the alkylation reaction greatly minimizes polyalkylation of the benzene hydrocarbons by these short chain hydrocarbon radicals resulting from the depolymerized polymer olefins. The better detergents are obtained from those alkylated hydrocarbons wherein only one alkyl group is added by the alkylation reaction that uses this polymer mono-olefin as the alkylation medium.

By fractionating the admixture of alkylated hydrocarbons resulting from the alkylation reaction, these low boiling alkylated benzenes, or short-chain alkylated benzenes, can be separated from the desired alkylated benzenes resulting from the polymers that did not depolymerize. The mono-sulphonates of these alkylated benzene hydrocarbons, wherein the alkyl group is obtained from the undepolymerized polymer, have excellent scouring, washing and detergent properties.

The conditions used in carrying out the alkylation reaction may vary somewhat but it is advisable to observe the following conditions:

1. The catalyst, preferably aluminum chloride, forms a complex and should not be reused.

2. Dry HCl should be present; 5 grams of HCl or less, is sufficient per 500 grams of benzene.

3. The presence of iron in the reaction mass will materially retard or inhibit alkylation and for this reason glass-lined reaction vessels are preferably used.

The following example is given by way of illustration to further described the alkylation procedure:

EXAMPLE I 320 grams of polymer olefin (approximately 2 mols) distilling within the range herein described are introduced into about 1,000 grams of dry benzene containing hydrogen chloride and approximately ten grams of anhydrous aluminum chloride. The olefins are added over a period of approximately 20 minutes and during this time the temperature of the mass will rise to about 60° C. The mass is stirred for one hour and then the catalyst complex is permitted to settle out. The upper layer, after neutralization with caustic, is fractionated to remove the unreacted benzene, polymers and low boiling alkylated benzenes from the mixture of alkylated benzenes having an alkyl chain formed from a polymer mono-olefin distilling within the range of substantially 160–245° C. but preferably within the range of 175–228° C. In the distillation step, the unreacted benzene was removed by fractionation up to a vapor temperature of 115° C., vacuum was then applied and the unreacted polymers along with the low boiling alkylated benzenes removed at temperatures up to about 120° C. at 1 m. m. pressure, and the desired alkylated products removed between about 115–170° C. at 1 m. m. pressure.

The procedure used to form the mono-sulphonic acid derivative of the alklated benzene hydrocarbon may be the same as that disclosed in my copending application Serial No. 88,685, filed July 2, 1936, wherein substantially 50 parts by weight of the alklated benzene hydrocarbon and substantially 10 parts by weight of 95% sulphuric acid are placed in a suitable reactor and substantially 65 parts by weight of 25% oleum added slowly thereto, preferably with cooling. After the reaction is completed, water is added to effect the separation of the major portion of the spent acid, which is drawn off, and the upper layer comprising the mixture of mono-alkylated benzene mono-sulphonic acid is preferably converted to the desired metal salt the following examples are given by way of illustration to further described the sulphonation procedure.

EXAMPLE II

Twenty-five grams of the mixture of the mono-alkylated benzenes are placed in a glass-lined reaction vessel fitted with a stirrer, thermometer and dropping funnel. To the 25 grams of alkylated benzenes which have been chilled to approximately 0–5° C. are added 5 grams of 95% sulphuric acid over a period of 10 minutes. Then 30 grams of 22.5% oleum are added over a period of 1½ hours. The sulphonation reaction is preferably carried out at about the temperature of an ice bath. Stirring in an ice bath is continued for approximately one hour, then the bath is removed and the mixture stirred for about one-half hour without cooling. The ice bath is then replaced and 10 grams of water added slowly, not allowing the temperature to exceed about 10° C. The reaction mixture is then permitted to settle for approximately four hours, the lower layer, containing the major portion of the spent acid, is drawn off, and the upper layer is dissolved in alcohol and neutralized with sodium hydroxide. After filtering off the sodium sulphate, the mono-sulphonated product is dried. If desired, the sulphonated product may be neutralized in a water solution, additional sodium sulphate added, and then dried. Drum drying and spray-drying have proved very satisfactory.

EXAMPLE III

To about 25 grams of the alkylated benzenes are added 44 grams of 100% sulphuric acid, rapidly. The temperature is allowed to rise to about 40° C. and the temperature maintained at 40° C. for about three hours. The mass is then cooled and 8 grams of water added while the temperature is maintained below about 25° C. The mono-sulphonated product may then be separated from the spent acid in the manner described above in Example II.

By using the alkylation and sulphonation procedure hereindescribed, or their equivalents, efficient detergents may be prepared by using coal tar naphtha as the source of the hydrocarbon of the benzene series. For example, a coal tar naphtha having an end boiling point of about 100° C., 107° C., 110° C., or 140° C. may be used. The polymer mono-olefins used to alkylate these coal tar naphtha fractions are the same as those described herein.

The amount of catalyst used to alkylate the benzene hydrocarbons may be varied within relatively wide limits and other alkylating catalysts such as sulphuric acid and solid phosphoric acid may be used in the place of a Friedel-Crafts catalyst. It has been found, however, that aluminum chloride is the better catalyst for use in preparing the product of my invention.

The mixture of mono-sulphonated hydrocarbons herein described may be converted to any of their water soluble salts such as the sodium, potassium or ammonium salts.

The detersive efficiency of the alkylated benzene mono-sulphonates may be illustrated by the following lauderometer test: A strip of white fabric 6″ x 25′ which has been thoroughly desized by washing with alkaline and soap baths is pulled through a standard soil solution, dried in a heated air tunnel, and the process repeated until a baryta whiteness of 27–30% is obtained. The soil bath consists of a suspension of colloidal graphite in a solution of a mineral and vegetable oil in carbon tetrachloride. This soil is very difficult to remove from cloth and the removal of 50–60% of the soil by a detergent represents an exceptionally high degree of detergency.

The soiled cloth is cut into 6″ squares and a square is placed in a pint jar containing 100 c. c. of the wash solution to be tested. The wash solution contains 0.2% detergent, and the solution is preheated to 150° F. The jars are placed in the launderometer which is maintained at 150° F. and the contents of the jars are agitated by a suitable shaking machine. After agitating for 10 minutes, the fabric is removed from the jar and given two 100 c. c. water rinses (the water being of the same hardness as that used in the test) and a strip 1½″ wide is cut off and dried. The remainder of the cloth is rewashed and at the end of another ten minute wash period another 1½″ strip is removed. This operation is repeated a third and a fourth time. The height of the lather in the pint jar is noted at the end of the second washing; a four inch lather is the maximum under the test conditions. The whiteness of the washed and dried strip is determined by means of a photo-electric reflector meter. The reading with the soiled cloth before washing is set at 0 and the whiteness of the clean fabric before soiling at 100. It follows therefore that the readings give directly the percentage soil removal in each of the four 10 minute washes.

To illustrate the detersive efficiency of the compounds of the present invention, a polymer fraction boiling between 115–245° C. and of the type hereinbefore described was fractionated and the following cuts condensed with benzene in the presence of aluminum chloride by the procedure herebefore described: 110–135° C.; 135–140° C.; 160–165° C.; 175–180° C.; 190–195° C.; 205–210° C.; 220–225° C.; and 235–240° C.; the resulting mono-alkyl benzenes were sulphonated by the procedure hereinbefore described and the detergents avaluated by the foregoing launderometer tests.

TABLE II

Detersive efficiency by the launderometer test in soft water (50 p. p. m.) containing 0.2% concentration of detergent

| Boiling range of the polymer mono-olefin used to form the mixture of mono-alkyl benzene monosodium sulphonates | Height of suds in inches | Percentum soil removal | | | |
|---|---|---|---|---|---|
| | | 1st wash | 2nd wash | 3rd wash | 4th wash |
| 110–135° C | Trace | 7 | 7 | 9 | 10 |
| 135–140° C | Trace | 9 | 12 | 12 | 14 |
| 160–165° C | 2 | 10 | 15 | 17 | 21 |
| 175–180° C | 4 | 13 | 22 | 32 | 38 |
| 190–195° C | 3 | 17 | 31 | 36 | 41 |
| 205–210° C | 4 | 24 | 37 | 44 | 51 |
| 220–225° C | 4 | 19 | 28 | 34 | 42 |
| 235–245° C | 4 | 16 | 26 | 31 | 35 |

TABLE III

*Detersive efficiency by the launderometer test in hard water (300 p. p. m.) containing 0.2% concentration of detergent.*

| Boiling range of the polymer mono-olefin used to form the mixture of mono-alkyl benzene monosodium sulphonates | Height of suds in inches | Percentum soil removal | | | |
|---|---|---|---|---|---|
| | | 1st wash | 2nd wash | 3rd wash | 4th wash |
| 110–135° C | Trace | 5 | 7 | 11 | 19 |
| 135–140° C | Trace | 3 | 6 | 8 | 12 |
| 160–165° C | 1 | 24 | 37 | 43 | 50 |
| 175–180° C | 4 | 18 | 32 | 42 | 48 |
| 190–195° C | 2 | 25 | 40 | 47 | 53 |
| 205–210° C | 4 | 22 | 33 | 39 | 44 |
| 220–225° C | 3 | 14 | 15 | 16 | 21 |
| 235–245° C | 2 | 10 | 6 | 6 | 10 |

It is apparent from the data set forth in Table II and Table III that the preferred boiling range of the aliphatic polymer is within the range of about 175–228° C. However, when the detergent is to be used in soft water, the end boiling point of the polymer used as the alkylation medium may be as high as 245° C. and, on the other hand, when the detergent is to be used in hard water, the initial boiling point of the polymer used as the alkylation medium may be as low as 160° C. The total range of 160–245° C. therefore, may be used in preparing the compounds of this invention but if it is desired to prepare a detergent that is highly efficient in both hard and soft water, the distilling range of the polymer olefin should lie between substantially 175–228° C. In preparing the mixture of mono-alkylated benzene mono-sodium sulphonates described in Tables II and III above, the various fractions of polymer mono-olefins contained some polymer mono-olefins which depolymerized during the alkylation reaction and formed low boiling alkylated benzene hydrocarbons which were removed from the desired mono-alkylated benzene hydrocarbon by fractionation. The use of an excess of benzene in the alkylation reaction made it possible to obtain a substantial quantity of the desired mono-alkylated benzene hydrocarbons wherein the alkyl chain corresponds to a polymer mono-olefin having a boiling range within the limits herein specified. The mono-sulphonates of these mixtures of mono-alkylated benzene hydrocarbons are highly efficient detersive agents as shown by the data in the preceding tables.

Attempts to prepare sulphonated alkylated aromatic compounds from high molecular weight olefins, such as those obtained by polymerizing low molecular weight olefins, have proven unsatisfactory because of the low yield of mono-alkylated or desired products. To a large extent, the depolymerization of the olefins during the alkylation reaction is responsible for the low yield of desired products. According to the present invention it has been discovered that high yields of efficient detergents can be obtained by the process described herein when the added alkyl group is derived from a mixture of hydrocarbon polymers distilling within the range of substantially 160–245° C. and comprising mostly aliphatic mono-olefins.

If desired, the hydrocarbon polymers used to prepare the alkylated benzenes may be subjected to a depolymerization treatment before being used to alkylate the benzene hydrocarbons. The conditions used in this pretreatment will vary somewhat with the composition of the polymers but, in general, the depolymerizing conditions should be sufficient to cause the depolymerizable polymer-olefins to react or decompose without causing appreciable polymerization of the other olefin polymers. For example, the polymer olefins may be mixed with about 1–3% by weight of a Friedel-Crafts catalyst, such as AlCl₃ and a small amount of HCl, and stirred for about 40 to 60 minutes at a low temperature not exceeding about 60° C., preferably within the range of 30 to 50° C. The hydrocarbon polymers not altered by this treatment are separated by fractional distillation from the low boiling and high boiling products formed by the pretreatment. The recovered polymer olefins boiling within the range of 160–245° C. may be used to alkylate the benzene hydrocarbons under the conditions herein disclosed.

While my invention has been described and illustrated by specific examples, it is not limited thereby except as defined in the appended claims. This application is a continuation-in-part of my co-pending application Serial No. 88,685, filed July 2, 1936.

What I claim is:

1. A detergent comprising essentially a mixture of water-soluble salts of mono-sulphonated alkylated benzene compounds obtained by alkylating an excess of a hydrocarbon of the benzene series boiling within the range of 79–184° C. with a mixture of hydrocarbon-polymers distilling within the range of approximately 160–245° C. and comprising mostly aliphatic mono-olefins and small amounts of polymer olefins of the triisobutylene type, separating from the alkylated products a mixture of alkylated benzene hydrocarbons having one alkyl group with the same number of carbon atoms as that contained in an olefin boiling within the range of approximately 160–245° C., mono-sulphonating the said separated mixture of alkylated benzene hydrocarbons and converting the mixture of sulphonic acid to the water-soluble salts.

2. A detergent comprising essentially a mixture of alkali metal salts of mono-sulphonated alkylated benzene compounds obtained by alkylating, by means of a Friedel-Crafts synthesis, an excess of a hydrocarbon of the benzene series boiling within the range of 79–140° C. with a mixture of hydrocarbon-polymers distilling within the range of approximately 160–245° C. and comprising mostly aliphatic mono-olefins and small amounts of polymer olefins of the triisobutylene type, separating from the alkylated products a mixture of alkylated benzene hydrocarbons having one alkyl group with the same number of carbon atoms as that contained in an olefin boiling within the range of approximately 160–245° C., mono-sulphonating the said separated mixture of alkylated benzene hydrocarbons and converting the mixture of sulphonic acid to the alkali metal salts.

3. A detergent comprising essentially a mixture of mono-sulphonated alkylated benzene compounds obtained by alkylating an excess of a hydrocarbon of the benzene series boiling within the range of 79–110° C. with a mixture of hydrocarbon-polymers distilling within the range of approximately 160–245° C. and comprising mostly aliphatic mono-olefins and small amounts of depolymerizable polymer olefins, separating from the alkylated products a mixture of alkylated benzene hydrocarbons having one alkyl group with the same number of carbon atoms as that contained in an olefin boiling within said range of approximately 160–245° C., and mono-sulphonating said separated mixture of alkylated benzene hydrocarbons.

4. A detergent comprising essentially a mixture of alkali metal salts of mono-sulphonated alkylated benzene compounds obtained by alkylating, by means of aluminum chloride and small amounts of hydrogen chloride, an excess of hydrocarbons of the benzene series boiling within the range of 79–107° C. with a mixture of hydrocarbon-polymers distilling within the range of approximately 160–245° C. and comprising mostly aliphatic mono-olefins and small amounts of triisobutylene, separating from the alkylated products a mixture of alkylated benzene hydrocarbons having one alkyl group with the same number of carbon atoms as that contained in the olefin boiling within said range of approximately 160–245° C., mono-sulphonating said separated mixture of alkylated benzene hydrocarbons and converting the mixture of sulfonic acid to the alkali metal salts.

5. A detergent comprising essentially a mixture of water-soluble salts of mono-sulphonated mono-alkylated benzene obtained by alkylating, by means of a Friedel-Crafts catalyst, an excess of benzene with a mixture of hydrocarbon-polymers distilling within the range of approximately 160–245° C. and comprising mostly aliphatic mono-olefins and small amounts of polymer mono-olefins of the triisobutylene type, separating from the alkylated products a mixture of mono-alkyl benzene hydrocarbons having an alkyl group with the same number of carbon atoms as that contained in an olefin boiling within said range of approximately 160–245° C., mono-sulphonating the said separated mixture of mono-alkylated benzene hydrocarbons and converting the mixture of sulphonic acid to the water soluble salts.

6. A detergent comprising essentially a mixture of sodium salts of mono-sulphonated mono-alkylated benzene compounds obtained by alkylating an excess of benzene with a mixture of hydrocarbon-polymers distilling within the range of approximately 160–245° C. and comprising mostly of aliphatic mono-olefins and small amounts of depolymerizable polymer olefins of the triisobutylene type, separating from the alkylated products a mixture of the mono-alkylated benzene hydrocarbons having an alkyl group with the same number of carbon atoms as that contained in an olefin boiling within said range of approximately 160–245° C. mono-sulphonating the said separated mixture of mono-alkylated benzene hydrocarbons and converting the mixture of sulphonic acid to the sodium salts.

7. A detergent comprising essentially a mixture of sodium salts of mono-sulphonated alkylated benzene compounds obtained by alkylating an excess of a hydrocarbon of the benzene series boiling within the range of 79–110° C. with a mixture of hydrocarbon-polymers distilling within the range of approximately 175–228° C., and comprising mostly aliphatic mono-olefins and small amounts of polymer mono-olefins of the triisobutylene type, separating from the alkylated products a mixture of mono-alkylated benzene hydrocarbons having one alkyl group with the same number of carbon atoms as that contained in an olefin boiling within said range of approximately 175–228° C., mono-sulphonating the said separated mixture of mono-alkylated benzene hydrocarbons and converting the mixture of sulphonic acids to the sodium salts.

8. A detergent comprising essentially a mixture of sodium salts of mono-sulphonated mono-alkylated benzene obtained by alkylating an excess of benzene with a mixture of hydrocarbon-polymers distilling within the range of approximately 175–228° C. and comprising mostly aliphatic mono-olefins and small amounts of polymer mono-olefins of the triisobutylene type, separating from the alkylated products a mixture of mono-alkylated benzene having an alkyl group with the same number of carbon atoms as that contained in an olefin boiling within said range of approximately 175–228° C., mono-sulphonating the said separated mixture of mono-alkylated benzenes and converting the mixture of sulphonic acids to the sodium salts.

9. A detergent comprising essentially a mixture of sodium salts of mono-sulphonated mono-alkylated benzene obtained by alkylating an excess of benzene with a mixture of hydrocarbon-polymers distilling within the range of approximately 160–228° C., and comprising mostly aliphatic mono-olefins and small amounts of polymer mono-olefins of the triisobutylene type, separating from the alkylated products a mixture of mono-alkylated benzenes having an alkyl group with the same number of carbon atoms as that contained in an olefin boiling within said range of approximately 160–228° C., mono-sulphonating the said separated mixture of mono-alkylated benzenes and converting the mixture of sulphonic acids to the sodium salts.

10. A detergent comprising essentially a mixture of water-soluble salts of mono-sulphonated alkylated benzene compounds obtained by alkylating, by means of a Friedel-Crafts synthesis, an excess of an hydrocarbon of the benzene series boiling within the range of 79–110° C., with a mixture of hydrocarbon-polymers distilling within the range of approximately 160–245° C. and consisting mostly of aliphatic mono-olefins, the major portion of which is selected from the group consisting of decenes, undecenes, dodecenes, tridecenes and tetradecenes, to produce a preponderant proportion of alkylated benzene hydrocarbons having one alkyl group with the same number of carbon atoms as that contained in an olefin boiling within the said range of approximately 160–245° C., sulphonating said mixture of alkylated benzene hydrocarbons to form the mono-sulphonic acid derivatives, and converting the mixture of sulphonic acids to the water soluble salts.

11. A detergent comprising essentially a mixture of water-soluble salts of mono-sulphonated mono-alkylated benzene compounds obtained by alkylating an excess of benzene with a mixture of hydrocarbon polymers distilling within a range of approximately 160–228° C. and comprising mostly aliphatic mono-olefins, sulphonating the mixture of mono-alkylated benzenes to form the mono-sulphonic acid, and converting the admixture of sulphonic acids to the sodium salts.

12. A method of preparing a detergent which comprises alkylating a hydrocarbon of the benzene series boiling within the range of 79–184° C. with a mixture of hydrocarbon-polymers distilling within the range of approximately 160–245° C. and comprising mostly aliphatic mono-olefins and small amounts of polymer olefins of the triisobutylene type, separating from the alkylated products a mixture of alkylated benzene hydrocarbons having one alkyl group with the same number of carbon atoms as that contained in an olefin boiling within said range of approximately 160–245° C., sulphonating the thus separated alkylated benzene hydrocarbons to form the mono-sulphonic acid derivatives and converting the mixture of sulphonic acids to the water soluble salts.

13. A method of preparing a detergent which comprises alkylating a hydrocarbon of the benzene series boiling within the range of 79–110° C. with a mixture of hydrocarbon-polymers distilling within the range of approximately 160–228° C. and comprising mostly aliphatic mono-olefins, separating from the alkylated products a mixture of alkylated benzene hydrocarbons having one alkyl group with the same number of carbon atoms as that contained in an olefin boiling within said range of 160–228° C., mono-sulphonating the said separated mixture of alkylated benzene hydrocarbons and converting the mixture of sulfonic acids to the sodium salts.

14. A method of preparing a detergent which comprises alkylating an excess of benzene with a mixture of hydrocarbon-polymers distilling within the range of approximately 175–228° C. and comprising mostly aliphatic mono-olefins and small amounts of polymer olefins of the triisobutylene type, separating from the alkylated products a mixture of mono-alkylated benzenes having an alkyl group with the same number of carbon atoms as that contained in an olefin boiling within said range of approximately 175–228° C., mono-sulphonating the said separated mixture of mono-alkylated benzenes and converting the mixture of sulphonic acids to the sodium salts.

15. A method of preparing a detergent which comprises alkylating a hydrocarbon of the benzene series boiling within the range of 79–110° with a mixture of hydrocarbon polymers distilling within the range of approximately 160–245° C. and comprising mostly aliphatic mono-olefins which will not depolymerize under the conditions of the alkylation reaction, separating from the alkylated products a mixture of alkylated benzene hydrocarbons having one alkyl group with the same number of carbon atoms as that contained in an olefin boiling within said range of approximately 160–245° C., mono-sulphonating said separated mixtures of alkylated benzene hydrocarbons and converting the mixture of sulphonic acids to the alkali metal salts.

LUCAS P. KYRIDES.